United States Patent

Heath

[15] 3,635,790
[45] Jan. 18, 1972

[54] PROCESS FOR THE THERMAL OXIDATION OF SPENT LIQUOR
[72] Inventor: Thomas K. Heath, Westport, Conn.
[73] Assignee: Dorr-Oliver Incorporated, Stamford, Conn.
[22] Filed: July 2, 1969
[21] Appl. No.: 838,522

[52] U.S. Cl. .................................. 162/30, 23/48, 23/49, 162/31, 162/36
[51] Int. Cl. .................................................. D21c 11/12
[58] Field of Search .................. 162/29, 30, 31, 36; 23/48, 23/49

[56] References Cited

UNITED STATES PATENTS

| | | | |
|---|---|---|---|
| 2,702,235 | 2/1955 | Hochmuth | 23/48 |
| 2,744,812 | 5/1956 | Coulter | 23/48 |
| 2,833,619 | 5/1958 | Owens | 23/48 |
| 2,956,503 | 10/1960 | Niedl | 415/213 |
| 3,067,960 | 12/1962 | Niedl | 241/255 |
| 3,256,059 | 6/1966 | Biggs | 162/30 |
| 3,309,262 | 3/1967 | Copeland | 162/30 |
| 3,439,724 | 4/1969 | Mason | 162/30 |

Primary Examiner—S. Leon Bashore
Assistant Examiner—Richard H. Anderson
Attorney—T. M. Jablon and Burtsell J. Kearns

[57] ABSTRACT

A partially concentrated spent liquor is introduced into a venturi-type scrubber-evaporator along with combustion gases containing entrained solids from a fluidized bed reactor. From the scrubber-evaporator, the combustion gases are removed with a cyclone separator and the remaining concentrated spent liquor and entrained solids are passed through a comminuting device. Preferably the comminution device is a comminution pump. The comminution device grinds the entrained solids into very fine particles by continuous recycling. The resulting concentrated spend liquor containing finely ground solids can be partially recycled to the venturi-type scrubber-evaporator by mixing a portion of the fine solid containing liquor with the original spent liquor feed to the venturi. The amount of solids fed to the venturi-type scrubber-evaporator can be controlled by varying the amount of find solid containing liquor feed. The remainder of the fine solid containing concentrated spent liquor is fed to the fluidized bed oxidation reactor whereby an ash bed product can be treated for chemical recovery without the problem of scrubber-evaportor shutdowns due to large solid particles.

16 Claims, 5 Drawing Figures

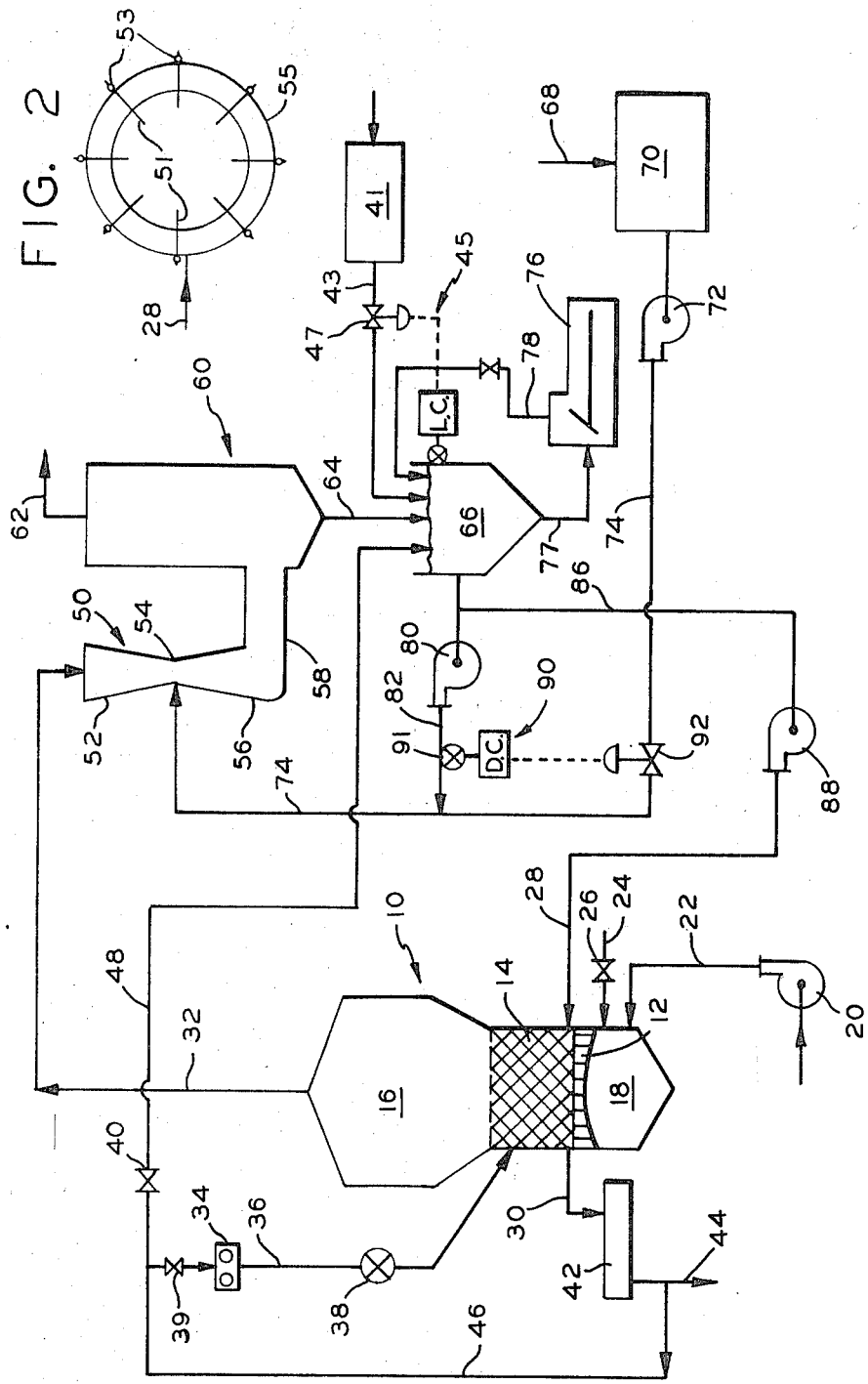

INVENTOR.
THOMAS D. HEATH

ATTORNEY.

PROCESS FOR THE THERMAL OXIDATION OF SPENT LIQUOR

In many industries, and in particular the pulp and paper industry, the spent liquors coming from digestion processes are of potential value because of the chemicals remaining in the liquor after the digestion operation. In the kraft process, an economical heat and recovery system has been used for many years. For the sulphite and neutral sulphite semichemical (NSSC) pulping processes, however, economically attractive recovery systems have yet to be devised even though considerable effort and time and money have been expended for the past 30 to 40 years. The growth of the latter pulping processes have been considerably hindered by the failure to develop a suitable recovery process.

Furthermore, because no economically attractive recovery system is available, many pulping mills using sulphite processes have found it necessary to discharge their spent liquors into lagoons and nearby streams.

Moreover, in the small kraft pulp mills the large capital expenditure for recovery systems usually cannot be justified and therefore it is also the practice in these mills to dispose the spent liquors by discharging them into streams and rivers.

With the mounting restrictions by pollution control authorities, it has become increasingly urgent that such mills find economical means of disposing spent liquors inoffensively and in certain cases recovering chemical values from the spent liquors.

It has been proposed to treat the spent liquor coming from said chemical digestion process directly in a fluidized bed to effect thermal oxidation of the liquor.

In accordance with said process, spent liquor from the mill is initially concentrated in a multieffect evaporator and thereafter introduced into a venturi-type direct contact scrubber-evaporator where it comes in contact with hot combustion gases coming from the fluidized bed reactor. In accordance with the prior practice, the hot combustion gases from the fluidized bed reactor are initially passed through a conventional dust cyclone to remove the coarse fraction of the entrained solids prior to the gases being introduced into the venturi.

In the venturi, the hot gases are accelerated to a high velocity as they pass through the constricted neck section atomizing the spent liquor into extremely fine droplets thus effecting a further concentration of the partially concentrated liquor.

The concentrated liquor is thereafter pumped into the fluidized bed where it is subjected to a thermal oxidation reaction to produce a pelletized ash bed product and inoffensive stack gases.

While the above prior process is effective for disposing spent liquors, it was found that the dust cyclone tended to scale and plug with the solids carried over from the reactor. Eventually, it was necessary to abandon operation of the cyclone system and to bypass the cyclone by introducing the hot gases with entrained solids directly into the venturi scrubber. While this, of course, eliminated scaling in the cyclone, it was subsequently found that large solid particles formed in the venturi evaporator system not only tended to disrupt the operation of the venturi evaporator but also it became necessary to periodically replace the feed pumps leading to the reactor because of the abrasive character of the solids.

Moreover, it was also necessary to remove or bleed solids from the system since these solids grew to a size too large to be handled by the system. However, the removal of these solids represented a loss of chemical and heat values and therefore adversely affected the overall economy of the operation.

Accordingly, it is an object of the present invention to provide improved process for the disposal of spent liquors coming from chemical digestion operations and containing organic and inorganic constituents.

It is a further object of this invention to provide improvements in the process for treating spent liquors in a fluidized bed which avoids the aforesaid disadvantages.

These and other objects and advantages of the invention which will appear hereinafter are attained by the present invention which comprises the steps of concentrating the spent liquor by subjecting said liquor to intimate contact with hot gases containing entrained solids in a direct contact scrubber-evaporator wherein said liquor is atomized while in direct heat exchange with said gases, subjecting the mixture of the thus concentrated spent liquor and solids to comminution to reduce said solids into fine particles and thereafter pumping the concentrated spent liquor containing fine particles into a fluidized bed.

By comminuting the entrained solids into very fine particles it was found that the solids can be held within the venturi recycle system and can be fed to the combustion reactor without interfering in the operation of the evaporator in the evaporation scrubbing system.

Moreover, it was also found that there was a noticeable decrease in the amount of abrasion of the pumps used for feeding the concentrated liquor to the reactor.

A further advantage attributed to the present invention is that the fine solids produced by comminution act as seed in the fluidized bed. This has the net effect of substantially reducing the amount of seed which must be produced by the dry recycle seed system. Therefore, in accordance with one embodiment of the invention, the dry recycle seeding system is eliminated and bed product solids are controllably added to the spent liquor feed system. These solids are eventually comminuted as they pass through the comminuting device thus increasing the solids content of the concentrated feed liquor.

An apparatus found particularly effective for comminuting these solids is a combined comminuting-pumping device since this device is capable of simultaneously performing two functions, namely, grinding and pumping. As will appear hereinafter, this device, because of its design, permits control over the particle size of the solids fed to the reactor. Thus the invention, by controlling the amount and size of the solids in the feed liquor, permits control over the size of the bed particles.

It will be recognized, however, that this invention is not limited to the particular comminuting device employed and that any other apparatus capable of grinding solids may be utilized.

In order that it may be clearly understood and readily carried into effect, the invention will now be described by way of example with reference to the accompanying drawings in which:

FIG. 1 is a diagrammatic flowsheet of the process of the present invention as applied to the disposal of spent liquors;

FIG. 2 is a diagrammatic representation of the preferred feed arrangement for feeding spent liquor into the bottom portion of the fluidized bed;

Figure 3:
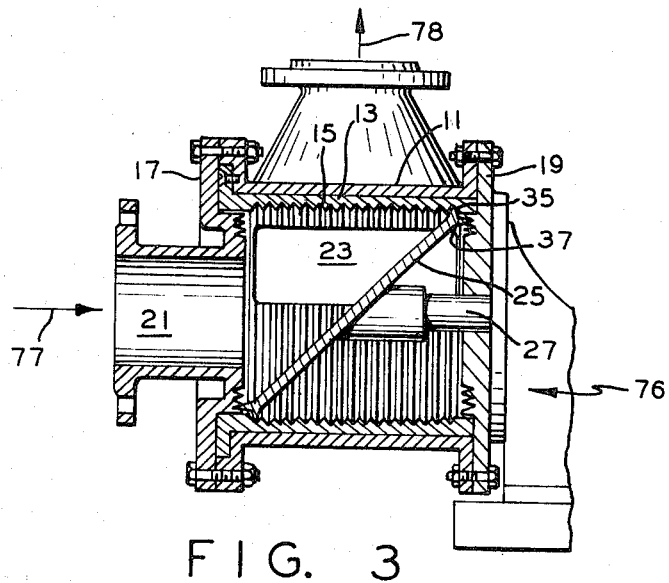
FIG. 3 is a cross-sectional view of one form of a comminuting pump suitable for use in the invention showing a pump body with its impeller or rotor disc.

Referring now the the drawings, there is shown a fluidized bed reactor 10, a direct contact scrubber-evaporator 50 and a cyclonic separator 60.

Reactor 10 is provided with the usual gas-permeable constriction plate 12 upon which there is supported a fluidized bed 14 of granular material preferably the pelletized ash product resulting from the oxidation reaction which product comprises a mixture of sodium sulphate and sodium carbonate.

Superposed above said fluidized bed 14 is freeboard section 16 preferably having a larger cross-sectional area than the bed section 14 as shown, to prevent carryover of coarse ash material.

Below said constriction plate is the customary wind box section 18 into which air for both fluidization and oxidation is supplied such as by pump 20 through line 22. A suitable fuel, for initially heating said fluidizing gas, is diagrammatically shown as being fed into the wind box through line 24. When the required bed temperature is reached, the fuel supply is shut off by closing valve 26.

Reactor 10 is further provided with a plurality of conduits for admitting and removing material from the reactor such as a feed conduit 28 for feeding the spent liquor to be treated into said bed; discharge conduit 30 for removing the pelletized ash product from the reactor bed 14; and exhaust conduit 32 leading from the upper portion of the freeboard section 16 for removing the combustion gases with entrained solids from the reactor 10.

In accordance with this invention, exhaust conduit 32 leads directly into a direct contact scrubber-evaporator 50 which will be described in more detail hereinafter.

As indicated above, the pelletized bed product is discharged from the reactor 10 via conduit 30 is preferably conducted to a product cooler, indicated by reference numeral 42, which may be of any of the conventional type of coolers or for that matter a subsequent fluidized bed. The cooled product is thereafter discharged through line 44 to waste and/or to suitable utilization of its chemical values.

As shown, a portion of the cooled discharge product is, preferably controllably recycled through line 46 to the fluid bed wherein it acts as a seed for the pelletization of the incoming spent liquor. In one embodiment, utilizing the dry recycle seeding system, the cooled discharged product is first crushed in crusher 34 and thereafter controllably fed to bed 14 through line 36 provided with valve 38.

Alternatively, as indicated hereinbefore, the recycle seeding system, may be bypassed and a portion of the cooled discharge product fed via line 48 into receiving tank 66.

Valves 39 and 40 in lines 36 and 48 respectively control the inflow of solids.

The direct contact scrubber-evaporator 50 shown is of the venturi type having a converging upper section 52, a constricted neck section 54 into which preferably partially concentrated spent liquor is introduced and a diverging lower section 56 tangentially communicating with the cyclone separator 60 through a conduit 58.

Separator 60 is provided with an upper gas outlet 62 and a lower liquor outlet 64 communicating with a concentrated liquor-receivng tank 66. In accordance with this invention, the concentrated spent liquor and solids, carried over from the reactor 10, are passed through a comminuting device 76 to be described more fully hereinafter, wherein entrained solids are ground into very fine particles and then controllably recycled via line 78 to tank 66.

In this embodiment, the hot gases, introduced into the venturi via line 32 are accelerated to a high velocity as they pass through the constricted neck section, atomizing the liquor as they pass therethrough. With this type of apparatus, the flow of high-velocity gas atomizes the liquor into extremely fine droplets causing intimate contact between the liquor and hot gases and is effective to further concentrate the partially concentrated liquor.

Moreover, said direct contact between the hot combustion gases and liquor also effects a high removal of the solids entrained in said gases which are eventually collected in tank 66 along with the concentrated spent liquor.

As diagrammatically shown in FIG. 2, the preferred arrangement of feeding the spent liquor into bed 14 comprises a plurality of feed guns 51 which may be merely open end pipes located around the periphery of the reactor. Each gun 51 is provided with pump means, preferably a moyno-type pump, indicated by reference numeral 53, which communicate with each other through a common feed line 55 surrounding reactor 10 and which in turn receives the liquor to be treated from feed conduit 28.

While the drawings show the feed guns extending into the fluidized bed to substantially the same depth, it should be understood that feed guns of varying lengths may be employed.

In fact, with large diameter beds it will probably be necessary to vary the penetration depth of the guns to obtain uniform distribution of the feed.

Figure 4:
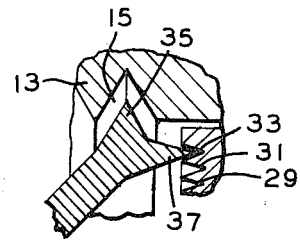
FIG. 4 is a fragmentary cross-sectional view showing the impeller teeth cooperating with one of the grooves in the casing and end plate.
Figure 5:
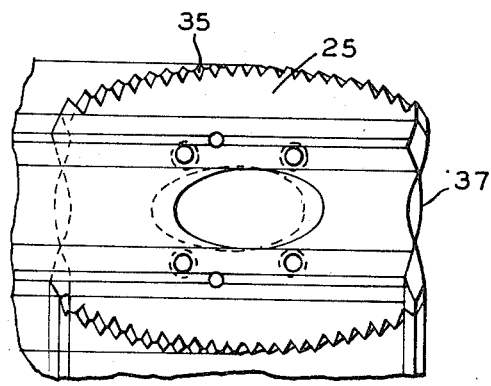
FIG. 5 is a plan view of the impeller or rotor disc for FIG. 3 particularly showing the grinding or comminuting teeth.

One form of a comminuting device suitable for carrying out the process of this invention is shown in FIGS. 3, 4 and 5.

In the preferred embodiment, comminution is effected in a combination comminuting-pumping device. As shown, the pump 76 comprises a generally cylindrical housing 11 provided with a replaceable liner 13 having plurality of grooves 15. Also provided are end plates 17 and 19 accommodating respectively an inlet orifice 21 and an outlet orifice 23. Outlet orifice 23 is provided with slotted discharge bars (not shown) for particle size control. The interior of housing 11 is further provided with a rotor or impeller disc 25 obliquely mounted on shaft 27 for rotation in said housing. The inlet orifice 21 lies on the axis of rotation of the rotor 27 whereas the outlet orifice 23 is provided along the inner periphery of the housing.

The inner faces of the end plate 17 and 19 are each provided with preferably three grooves 29, 31 and 33, better seen in FIG. 4, into which project the grinding teeth on disc 25. In the embodiment shown, the short edge of the disc 25 is provided with a tapered element 37 which projects into groove 33 whereas grooves 15 in liner 13 receive teeth 35 of the impeller disc 25. For the purposes of clarity, only one tapered element 37 engaging groove 33, is illustrated. It will be recognized, however, that in actuality there are two further tapered elements below element 37 adapted to engage grooves 31 and 29.

As indicated above the size of the undissolved solid particles is controlled by the slotted discharge bars in outlet orifice 23. In addition, a further control over the degree of comminution may be effected by recycling the spent liquor with comminuted fines from tank 66 through the comminuting device 76.

Comminuting devices of this type are well known in the industry and are commercially available under the trademark "Gorator." This device is described in detail in several U.S. Pats. including Nos. 2,956,503 and 3,067,960.

In operation, spent sulphite liquor, after separation from the pulp produced and containing from about 7 to about 14 percent solids, mainly as sodium lignosulphates in a dissolved state, is initially concentrated, such as in multieffective evaporators, not shown, and is fed via conduit 68 to a liquor surge tank, indicated by reference numeral 70.

The partially concentrated liquor coming from the evaporator is then pumped from surge tank 70 by pump 72 via line 74 into the neck section 54 of venturi 50 wherein it is atomized by the hot combustion gases as described above.

The amount of preconcentrated liquor fed from surge tank 70 to said venturi 50 is augmented by continuously recirculating to said venturi 50 a portion of the concentrated liquor separated in separator 60 and collected in tank 66. As shown, this recirculation liquor along with the ground solids is withdrawn from tank 66 by pump 80 and pumped to feed line 74 via line 82.

The recirculation of part of the concentrated liquor output of separator 60 back to venturi 50 has a number of advantages:

First, it provides a means of improving the heat and mass transfer efficiency in the final liquor concentration step;

Second, it improves the solids removal from the gas stream passing through venturi 50; and Third, it provides a convenient means for controlling the solids concentration of said liquor, that is of the feed liquor to the fluidized bed.

Control over the rate of feed of partially concentrated liquor from surge tank 70 to venturi 50 via line 74 is effected preferably by a density controller indicated generally by reference numeral 90.

Controller 90 includes a refractometer 91 which monitors the dissolved solids concentration of the liquor in line 82 by measuring the refractive index of the liquor in said line 82 and automatically adjusting valve 92 in line 74 to increase or decrease the amount of partially concentrated liquor fed from surge tank 70 to venturi 50. In this manner, the dissolved solids concentration of the liquor in line 82 is maintained at a predetermined level which is the level of solids concentration desired in the feed liquor to the fluidized bed reactor and which lies within the range of from 35 percent to 50 percent solids, in a dissolved state.

According to this invention, it is possible if desired to set density controller 90 so as to ensure a dissolved solids concentration in the liquor leaving venturi 50 and discharge from separator 60, sufficiently high to maintain autogenous liquor combustion conditions in a fluidized bed. This mode of operation offers considerable advantages, since by utilizing the sensible heat in the hot gases coming from the fluidized bed in the final liquor concentration step, just prior to the combustion of said liquor, certain heat economies can be attained in the overall process of disposing the spent digestion liquors. More particularly, it becomes possible to maintain autogeneous combustion conditions in the fluidized bed at a minimum expenditure for equipment and/or energy in initial spent-liquor concentration, required to produce the liquor passing to surge tank 70. Additionally, maintaining the gases leaving separator 60 at low temperatures prevents the formation of gases having offensive odors and the loss, from the spent liquor, of fuel values due to the evolution of volatile organic compounds while the spent liquor is undergoing its final concentration prior to oxidation in the fluidized bed.

As mentioned above, in the venturi, the liquor fed thereto is atomized by the accelerated hot gases passing through the constricted neck section and is concentrated while particulate matter is being removed by the liquor from the gases.

A mixture of liquor and gas enters cyclone separator 60 where the liquor droplets containing also the particulate matter removed from the gas in venturi 50 are separated from the gases. The relatively clean gas leaves separator 60 through outlet 62 wither to atmosphere or to a suitable heat exchanger, not shown, for heat recovery, while the further concentrated liquor containing also the solids captured in the venturi from the gas is discharged through outlet 64 to tank 66.

In accordance with this invention, a portion of the liquor in tank 66 is continuously passed via line 77 through comminuting pump 76 wherein the solids are reduced to a fine particle size before being controllably returned to tank 66 via line 78. When NSSC spent liquor is treated in accordance with this invention, it was found that an undissolved solids concentration in the range of from 0.5 to 1 percent in the feed liquor to the reactor was sufficient to eliminate or substantially reduce the amount of reseeding to the reactor.

From tank 66 another portion of the concentrated liquor is recirculated via line 82 into the venturi while a further portion is delivered via line 86 to introduction into the fluidized bed 14 for disposal.

The liquor in tank 66 is maintained at a constant level by level controller 45. If liquor in tank 66 falls below a predetermined level, weak spent liquor is controllably added to tank 66 from tank 41 via line 43. Adjustments of valve 47 in line 43 are made in response to the reading of controller 45 which measures the level of the liquor in tank 66.

Adjustments in the percent dissolved solids can be quickly made by changing the feed flow and/or weak liquor makeup. Variations in the organic and inorganic ratio that may affect combustion in the reactor can be quickly offset by appropriate adjustment in the liquor concentration through change in the control setting. This is important for maintaining combustion control in the reactor.

The spent liquor in tank 66 is continuously withdrawn by pump 88 and fed to common feed line 55. Thereafter the liquor is pumped by pumps 53 into the fluidized bed 14 wherein the liquor is oxidized at a temperature in the range from about 650° to 760° C. for complete oxidation of the solids content in the liquor.

Temperatures in excess of 760° C. should be avoided since at these temperatures the eutectic point of the granular bed material is exceeded causing a formation of a smelt and an eventual defluidization of the bed.

On the other hand, an excess amount of oxygen is required to achieve complete oxidation and to prevent generation of obnoxious odors. Control over the oxygen content in the fluidizing gas may be achieved by this invention by the use of an exit or stack gas analyzer, not shown, capable of indicating the amount of oxygen appearing in the exit gas in conduit 32 and automatically regulating the rate of oxygen supplied to the fluidized bed.

Accordingly, the supply of air to the fluidized bed is maintained at an adequate level for complete odorless combustion.

The combustion temperature according to the preferred embodiment of this invention, is maintained in the aforesaid range by the heat generated by the oxidation reactions carried out in a fluidized bed. However, should the temperature fall below about 650° C., supplementary fuel may be added directly to the bed or the fluidizing gas may be preheated such as by the combustion of fuel in a suitable burner. Thus, the temperature in the reactor is maintained high enough to effect thermal oxidation of the organic matter, yet not in excess of the eutectic temperature of the granular bed material.

It is expected, however, that supplementary fuel will only be required during the startup and shutdown operations and that once the fluidized bed has reached the aforesaid operating temperatures the combustion of the concentrated spent liquor fed to the bed will be autogenous.

I claim:

1. A process for effecting the thermal oxidation of spent digestion liquor containing organic and inorganic matter substantially in solution, with combustion of the organic matter in the reactor, and recovery of the inorganic matter as a dry pelletized product in a fluidized state in said reactor by an upflowing stream of combustion air maintaining a fluidized bed of said pelletized product and delivery from said reactor of said pelletized product and of hot combustion gases carrying entrained solids, which process comprises prior to said combustion concentrating said liquor by feeding the liquor directly into an atomizing stream of said hot gases, and delivering the thus concentrated mixture of liquor and solids to a collecting zone separated from the gases and resulting vapors, maintaining a substantially constant level of said mixture in said collecting zone, continuously subjecting the mixture containing said entrained solids to a comminution treatment reducing them to a finely subdivided state, and feeding a portion of said mixture largely containing said subdivided solids from the collecting zone to said fluidized bed while maintaining the temperature in the reactor high enough to effect said thermal oxidation of the organic matter in the spent liquor, yet not in excess of the eutectic temperature of the granular bed material.

2. The process according to claim 1, wherein said comminution treatment is effected by continuously withdrawing a portion of the mixture from the collecting zone, subjecting said withdrawn portion to comminution, and returning the thus treated mixture to said collecting zone.

3. The process according to claim 1, wherein a portion of pelletized product is returned into the mixture in said collecting zone, to be reduced to a finely subdivided state along with said entrained solids, providing nuclei for said pelletized product in said fluidized bed.

4. The process according to claim 1, wherein portion of the pelletized product is subjected to a dry comminuting treatment, and the resulting material is returned into the fluidized bed, providing nuclei for the formation of said pelletized product.

5. The process according to claim 1, wherein a portion of the mixture in said collecting zone is added to said spent liquor undergoing concentration by contact with said reaction gases.

6. The process according to claim 1, wherein said mixture is recirculated through pumping from said collecting zone, and delivery back into said collecting zone, and said comminution is effected while in transit between leaving and reentering said collecting zone.

7. The process according to claim 6, wherein said pumping and said comminution are effected in a single continuous operation.

8. The process according to claim 1, wherein substantially all of said mixture from the collecting zone is pumped into said fluidized bed.

9. The process according to claim 1, wherein the dissolved solids concentration in the liquor concentrated in said atomizing stream is continuously monitored, and the dissolved solids concentration is maintained in a predetermined range by controlling the rate of supply of said spent liquor from the monitor indications.

10. The process according to claim 1, wherein the dissolved solids concentration in said concentrated liquor is continuously monitored and the dissolved solids in said liquor is maintained in a range from about 35 percent to about 50 percent.

11. The process according to claim 1, wherein the dissolved solids concentration in said concentrated liquor is continuously monitored by refractometer measurements, and said measurements are applied for automatically controlling the rate of supply of said spent liquor.

12. The process according to claim 1, wherein a stream of said mixture is continuously added to said spent liquor undergoing concentration, and wherein the dissolved solids concentration in said stream is continuously monitored, and the dissolved solids concentration in the liquor fed into said atomizing stream is maintained in a predetermined range by controlling the rate of supply of said spent liquor from the monitor indications.

13. The process according to claim 1, wherein the rate of supply of said spent liquor is controlled in response to changes in the dissolved solids concentration in the mixture in said collecting zone.

14. The process according to claim 1, wherein a predetermined dissolved solids concentration in the mixture is maintained by controlling a supply of weak spent liquor to said collecting zone.

15. The process according to claim 1, wherein the size of the particles constituting the fluidized bed is controlled by controlling the amount and the size of the solids in the liquor being fed to the fluidized bed.

16. The process according to claim 1, wherein the spent liquor is derived from a neutral sulfite semichemical pulp treatment operation, and wherein the feed liquor to the fluidized bed is of an undissolved solids concentration in a range from 0.5 percent to 1 percent, providing an amount of nuclei for the formation of said pelletized product, sufficient to at least substantially reduce the amount of seeding the reactor.

* * * * *